(12) United States Patent
West

(10) Patent No.: US 7,708,281 B2
(45) Date of Patent: May 4, 2010

(54) METHOD OF SEALING A JOINT

(75) Inventor: Colin John West, Pontypridd (GB)

(73) Assignee: Airbus UK Limited, Bristol (GB)

( * ) Notice: Subject to any disclaimer, the term of this patent is extended or adjusted under 35 U.S.C. 154(b) by 0 days.

(21) Appl. No.: 11/020,872

(22) Filed: Dec. 22, 2004

(65) Prior Publication Data

US 2006/0192342 A1      Aug. 31, 2006

(30) Foreign Application Priority Data

Dec. 23, 2003    (GB) ................. 0329890.8

(51) Int. Cl.
*F16J 15/02* (2006.01)
*B64C 1/06* (2006.01)

(52) U.S. Cl. ............... 277/312; 277/630; 277/650; 244/131

(58) Field of Classification Search ............... 277/312, 277/630, 650, 651; 244/131
See application file for complete search history.

(56) References Cited

U.S. PATENT DOCUMENTS

| | | | | |
|---|---|---|---|---|
| 2,228,779 A * | 1/1941 | Pavlecka et al. | ............... | 52/394 |
| 2,460,181 A * | 1/1949 | Marshall | ............... | 428/354 |
| 2,711,334 A * | 6/1955 | Balfe | ............... | 428/597 |
| 3,022,870 A * | 2/1962 | John et al. | ............... | 403/267 |
| 3,276,334 A * | 10/1966 | Rhodes | ............... | 404/74 |
| 3,591,207 A * | 7/1971 | Fisher | ............... | 277/641 |
| 3,737,169 A * | 6/1973 | Glynn | ............... | 277/596 |
| 3,767,211 A | 10/1973 | Amphlett | | |
| 3,767,503 A * | 10/1973 | Maddalena | ............... | 156/244.22 |
| 3,837,657 A * | 9/1974 | Farnam et al. | ............... | 277/312 |
| 3,873,106 A | 3/1975 | Pastelak | | |
| 5,244,162 A * | 9/1993 | Bruce | ............... | 242/525 |
| 5,297,806 A * | 3/1994 | Kestly | ............... | 277/592 |
| 5,702,111 A * | 12/1997 | Smith | ............... | 277/650 |
| 6,530,575 B2 * | 3/2003 | Poquet et al. | ............... | 277/592 |
| 6,719,293 B1 * | 4/2004 | Coles et al. | ............... | 277/312 |
| 6,857,638 B2 * | 2/2005 | Dupont et al. | ............... | 277/608 |
| 6,915,987 B2 * | 7/2005 | Fisher et al. | ............... | 244/129.3 |
| 2002/0010223 A1 | 1/2002 | Botrie | | |

(Continued)

FOREIGN PATENT DOCUMENTS

DE    2 145 279    3/1973

(Continued)

OTHER PUBLICATIONS

European Search Report.

(Continued)

*Primary Examiner*—Alison K Pickard
(74) *Attorney, Agent, or Firm*—Patterson, Thuente, Skaar & Christensen, P.A.

(57) ABSTRACT

A method of sealing a joint between components especially in an aircraft comprises the steps of identifying the sealing gap to be sealed; selecting a suitable sealing material having a fractional maximum sealing thickness and a fractional fully-compressed thickness and selecting a suitable thickness of that sealing material, based on a consideration of the fractional maximum sealing thickness and the fractional fully-compressed thickness of the sealing material and on the sealing gap; locating, between the mating surfaces of the components to be sealed, the suitable thickness of the suitable sealing material; and fastening the components together.

9 Claims, 2 Drawing Sheets

U.S. PATENT DOCUMENTS

2005/0144874 A1* 7/2005 West et al. .................... 52/459
2006/0000075 A1* 1/2006 West et al. .................... 29/284

FOREIGN PATENT DOCUMENTS

| DE | 28 49 991 | | 5/1980 |
|---|---|---|---|
| EP | 0 103 828 | A3 | 3/1984 |
| EP | 1 213 127 | A1 | 6/2002 |
| EP | 1 235 007 | A2 | 8/2002 |
| WO | WO 02/089151 | A1 | 11/2002 |
| WO | WO 03/016756 | A2 | 2/2003 |
| WO | WO 03/039851 | A1 | 5/2003 |

OTHER PUBLICATIONS

Great Britain Search Report.

* cited by examiner

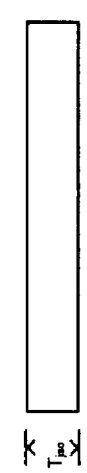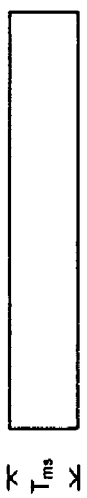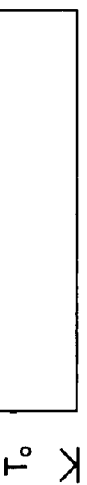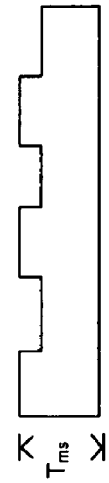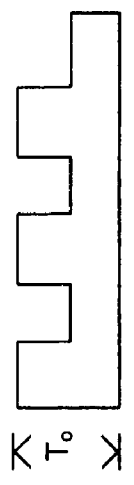

METHOD OF SEALING A JOINT

BACKGROUND OF THE INVENTION

The invention relates to a method of sealing a joint and, in particular, to a method of sealing an interfay joint during the manufacture of an aircraft.

In the manufacture of an aircraft it is necessary to provide fluid-tight sealing in many of the joints between components, for example, to prevent fuel leakage from fuel tanks or air leakage from pressurised cabins and to prevent water ingress into joints and consequent corrosion in those joints. Joints between components of an airframe are known as interfay joints.

The requirements for sealants used in aircraft include resistance to fuel and water, chemical compatibility with the metals and coatings used in the aircraft components and reliable maintenance of sealing performance over a wide temperature range and over the lifetime of the aircraft.

Polysulphide sealants are known for use in a range of sealing applications and, in particular, are known for use in sealing airframe interfay joints. The polysulphide sealant is typically cured via an oxidative mechanism promoted by a transition metal oxide, for example, manganese dioxide or dichromate compounds or via an organic chemical reaction, for example, epoxidation or condensation esterification. In general, the polysulphide sealants are currently used in aircraft manufacture are two-component systems, with the mixing of the components being done shortly before use of the sealant (one-component polysulphide sealants are known but do not, in general, meet the demanding requirements for use in aircraft).

In aircraft manufacture, the components to be assembled into the joint will usually be of lightweight aluminium alloy and will usually be painted prior to assembly. The joining or mating faces are first prepared by cleaning with a suitable solvent, light abrasion and wiping dry. Freshly-mixed sealant is then applied directly on to at least one mating face and the components are offered together and then fastened with bolts or the like. That known method of joint assembly suffers from a number of disadvantages, including:

- the premixing of the sealant components prior to use is labour-intensive, messy and requires accurate control and measurement of the levels of curing promoter in order to ensure that the period during which the sealant remains workable (the "work life") is sufficient for the planned joint assembly;
- the work life and the time required to cure the sealant both depend, inter alia, on the local conditions, in particular, humidity and temperature;
- application of the correct amount of liquid sealant requires skill and experience;
- the joint must not be disturbed until the sealant is cured which in practice may mean that no further work can be carried out on the components for a period of several days; and
- during tightening of the bolts, the liquid sealant is squeezed away from the immediate vicinity of each bolt thereby allowing direct contact of the components such that subsequent relative movement of the components during the lifetime of the aircraft can cause the paint to rub off, leaving the joint vulnerable to corrosion (this is known as "fretting").

Our British patent application No. 0329891.6 "A Sealing Material" filed on 23 Dec. 2003, discloses solid sheet sealant materials comprising a cured polysulphide sealant and a reinforcing element, for example, glass fibre. In one process, the mixed polysulphide sealant is spread over the glass fibre and is then pressed in a press while the polysulphide cures to produce a sheet or film of cured polysulphide/glass fibre composite. In use, the sheet is cut into shape and fitted like a gasket in between the mating surfaces of two components. The components are then fastened together with bolts or the like to form the joint. As the fasteners are tightened, the metal of the components in the immediate vicinity of each fastener distorts such that in those areas the mating surfaces are brought closer together. A solid sealing material or gasket located between those surfaces will, however, reach a minimum thickness beyond which it cannot be compressed further, in contrast to the conventional liquid sealants which are entirely, or almost entirely, squeezed out of the vicinity of each fastener.

It is highly desirable for the sealing material to seal effectively in both the areas of high compression around the fasteners and in the areas of lower compression in the "quilted" pockets between the fasteners. In general, using an increased thickness of sealing material will improve the sealing action. However, using such an increased thickness of sealing material increases the weight of the aircraft, involves additional cost and reduces any contribution to the stiffness of the joint made by the sealing material.

The behaviour under compression of a particular solid sealing material depends upon the physical and chemical nature of the material but also depends upon the dimensions of the material and the effects of any fillers, reinforcing elements or voids in the material. Thus, for a sealant of a particular chemical type, such as a polysulphide sealant, the actual behaviour under compression shown by different sealing materials including that sealant may vary over a wide range.

For the above reasons, there is a need to improve the process of identifying the optimum sealing material and the thickness of that sealing material to be used in a joint.

SUMMARY OF THE INVENTION

The present invention provides a method of sealing a joint between components comprising the steps of:

i) identifying the sealing gap to be sealed;

ii) selecting a suitable sealing material having a fractional maximum sealing thickness and a fractional fully compressed thickness and selecting a suitable thickness of that sealing material, based on a consideration of the fractional maximum sealing thickness and the fractional fully compressed thickness of the sealing material and on the sealing gap;

iii) locating, between the mating surfaces of the components to be sealed, the suitable thickness of the suitable sealing material; and iv) fastening the components together.

As described above, when the components in a joint are assembled and the fasteners are tightened, the metal in the immediate vicinity of each fastener is distorted to bring the mating surfaces of the components closer together in an annular area of high compression around each fastener. It has been found that those annular areas often have a diameter which is approximately 1½ times the diameter of the fastener. The distance between the mating surfaces of the components in that area of high compression is referred to as the "joint stand-off". In joints where conventional wet-applied sealants are used, the joint stand-off is often very small or zero. In joints where solid sealants of the gasket type are used, it has been found that the solid sealing material in the areas of high compression will reach a limiting thickness beyond which it cannot be compressed further under the pressures exerted by the fasteners, which may be of the order of 16 Nmm$^{-2}$. In that case, the joint stand-off is equal to that limiting thickness.

In the areas between the fasteners, the distance between the mating surfaces of the components will be larger. The maximum distance between the components in the fastened joint is referred to herein as the "maximum joint face separation".

The difference between the joint stand-off and the maximum joint face separation is referred to herein as the "sealing gap" and is the minimum range of thickness over which the compressed sealing material must show sealing capability. Put another way, the maximum sealing thickness should be equal to, or preferably greater than, the maximum joint face separation. In general, the sealing gap will depend upon the nature of the components and of the fasteners as well as the torque applied to the fasteners but will be largely independent of the nature of the sealant or sealing material used. The sealing gap can be calculated on the basis of the components and fasteners used and will normally be specified in the design stage for a joint in an airframe.

The effectiveness of the seal will depend on the pressure exerted on the sealing material by the components. In the high pressure areas around the fasteners, a good seal will usually be formed. However, the pressure exerted on the sealing material in the low pressure areas must also be sufficient to create a seal. In particular, the pressure exerted by the components upon the sealing material in the vicinity of the maximum joint face separation should be sufficient for the sealing material to form a seal against the components.

The effect of pressure on a piece of sealing material of thickness, $T_0$, be placed between two opposed surfaces can be described as follows. Initially, before any force is exerted, the sealing material is at its original thickness, $T_0$. As the surfaces are forced together, the sealing material is compressed. At a certain point, the pressure on the sealing material becomes equal to the minimum pressure required to make a seal between the sealing material and the surfaces. The thickness, $T_{ms}$, of the sealing material at that point is referred to herein as the "maximum sealing thickness". The fractional thickness at that point, expressed as a percentage, $T_{ms}/T_0 \times 100$ is referred to herein as the "fractional maximum sealing thickness". As the pressure on the sealing material is increased further, a point is eventually reached where the sealing material cannot be compressed further. The gap, $T_{jso}$, at that point between the surfaces is the joint stand-off and the fractional thickness of the sealant material, expressed as a percentage ($T_{jso}/T_0 \times 100$) is referred to herein as the "fractional fully compressed thickness".

For example, a particular sealing material may have an uncompressed thickness $T_0$ of 1 mm, a maximum sealing thickness $T_{ms}$ of 0.8 mm (corresponding to a fractional maximum sealing thickness of 80%) and when fully-compressed have a joint stand-off $T_{jso}$ of 0.3 mm (corresponding to a fractional fully-compressed thickness of 30%).

Knowledge of the above, and, in particular, of the fractional minimum sealing thickness and the fractional fully compressed thickness associated with a particular sealing material allows, in accordance with the invention, a sealing material thickness to be chosen. For example, in accordance with the method of the invention a minimum thickness of the sealing material is calculated and at least that minimum thickness of sealing material is used in the joint. In one embodiment, the process of the invention allows the use of data from material tests to be used to develop sealing material sheets, gaskets, tapes and the like which best fill voids whilst giving minimum joint stand-off to achieve a highly fatigue-resistant, high load-transferring, efficient sealing system with a maximum sealing range.

As mentioned above, interfay joints assembled using the currently-used, wet-applied sealants have effectively no joint stand-off, because around each bolt is a 'halo' of radius approximately half the bolt diameter outside the bolt where the liquid sealant is fully squeezed out and metal-to-metal contact can take place. That can give rise to fretting between the joint faces with a consequent negative effect on fatigue performance (over a period of many years in service of the aircraft).

In such an interfay joint, shear of fasteners and friction between joint faces in contact can help to transfer loading between the metal components, despite the potential for fretting to occur. Loading can also be transferred from one metal component to the other through the cured sealant, which has elastomeric properties. However, the degree of loading transfer through the sealant will be limited because the shear modulus (stiffness) of the cured sealant is relatively low.

In joints assembled according to the process of the present invention, there is a finite joint stand-off, which will in most cases be at least 0.25 mm with no component-to-component contact occurring. In such joints, fretting is eliminated but load transfer by direct contact of the metal component faces is also prevented. The loading must therefore be transferred only through the fasteners and the sealing material. The overall effect is to give a more consistent fatigue performance of the joints. However, the degree of load transfer through the sealing material will decrease with increasing thickness of the sealing material, and accordingly, it will not in general be desirable to use very large thicknesses of sealing material.

In one embodiment, the suitable sealing material and the thickness of that suitable sealing material are both selected in order to provide sealing across the sealing gap and a desired joint stand-off. In this embodiment, a range of sealing materials is taken into account, each sealing material having its own values of fractional maximum sealing thickness and fractional fully compressed thickness, and those values are taken into consideration, together with the available thicknesses of the sealing materials, to identify a suitable sealing material having a suitable thickness which will, in the joint, provide an effective seal even at the maximum joint face separation and which will give the desired joint stand-off in the areas of most compression. The range of sealing materials may for example be a range of materials having the same composition but having differing profiles.

In some cases, the sealant material will already be selected, for example, for reasons of cost or availability, and it will be necessary only to calculate the minimum thickness of that sealing material required to give effective sealing over the sealing gap. Accordingly, in that embodiment, a suitable sealing material is first identified and a minimum suitable thicknesses of that sealing material is calculated based on the fractional maximum sealing thickness, on the fractional fully compressed thickness of the sealing material and on the sealing gap, and a suitable thickness being equal to or greater than that minimum thickness is selected for use in the joint.

The selected suitable thickness of the sealing material may be the minimum thickness calculated, for example, where it is desired to reduce weight and/or cost to a minimum. Alternatively, it may be desired to use a thickness of sealing material which is greater than that minimum thickness to allow a safety margin thereby allowing for such factors as errors in measurement, variation in the manufacturing process and movement in the joint over time.

Where they are not already known, it may be necessary to test a sample of the sealing material to establish the fractional fully compressed thickness and/or the fractional maximum sealing thickness of that sealing material.

The fully compressed thickness may be ascertained by placing a 25 mm by 25 mm square of the sealing material of known thickness in a press and exerting a compressive force equivalent to 10 kN. (That force is approximately equal to the loading applied around a 6 mm diameter bolt when the bolt is tightened to the degree typically used in aircraft.) The fully compressed thickness is the thickness of the sealing material under pressure and the fractional fully compressed thickness is obtained simply by dividing that value by the original thickness.

The fractional maximum sealing thickness may be evaluated by assembling a test joint being part of a fuel tank. The test joint has a range of bolt sizes and inter-bolt spacings thereby giving a range of joint-face separations. The thickness of the sealing material to be tested is measured and then the sealing material is placed between the components as usual and the components are bolted together. After tightening of the bolts, aviation fuel is placed in the tank and the tank is pressurised to 35 psi ($2.4 \times 10^5$ $Nm^{-2}$) and the joint is examined for signs of leakage. The greatest joint face separation where leakage does not occur is taken to be the maximum sealing thickness. The fractional maximum sealing thickness is obtained by dividing the maximum sealing thickness by the original thickness.

Whilst the invention is generally applicable to solid sealing materials in a wide variety of forms, the solid sealing material is preferably in the form of a sheet or film. Sealing materials which comprise polysulphides are preferred. Especially preferably, the sealing material is a sheet or film of cured polysulphide sealant. Advantageously, the sheet or film of cured polysulphide resin includes a reinforcing element such as glass fibre, carbon fibre or Kevlar. Glass fibre is preferred due to the excellent bonding between glass and polysulphide sealants. The glass fibre may be in any form, for example bundles, loose fibres, chopped fibres, a fabric or a woven mat.

The method of the invention is applicable to the manufacture of any joint which requires compression of a solid sealing material of defined thickness. For example, the process of the invention is applicable to the assembly of joints in the manufacture of an aircraft, a marine craft or a land-based vehicle. The invention is particularly advantageous in the assembly of joints in an airframe. The process of the invention may be used in any airframe joint where wet applied sealants are currently used, for example, a fuselage joint, a stringer joint, a glazing unit joint, a joint in a pump and especially a joint between wing spars, ribs and stringers and the skin which is part of an integral fuel tank.

The invention also provides a method of establishing the minimum thickness of sealing material for a joint comprising the steps of:
  i) ascertaining the sealing gap to be sealed;
  ii) selecting a suitable sealing material having a fractional maximum sealing thickness and a fractional fully-compressed thickness;
  iii) calculating, from the fractional maximum sealing thickness and from the fractional fully-compressed thickness, the minimum thickness of sealing material required to seal over the sealing gap.

The invention further provides a method of sealing a joint between components during assembly of an aircraft comprising the steps of:
  i) identifying the sealing gap to be sealed;
  ii) selecting a suitable sealing material comprising cured polysulphide sealant having a fractional maximum sealing thickness and a fractional fully-compressed thickness and selecting a suitable thickness of that sealing material, based on a consideration of the fractional maximum sealing thickness and the fractional fully-compressed thickness of the sealing material and on the sealing gap;
  iii) locating, between the mating surfaces of the components to be sealed, the suitable thickness of the suitable sealing material; and
  iv) fastening the components together.

The effective sealing range, that is, the difference between the fully-compressed thickness and the maximum sealing thickness, can be increased for the same volume of sealing material by profiling or embossing a pattern in relief on the surface of the sealing material. The sealing material may be profiled or embossed on one side only. Alternatively, the sealing material may be profiled or embossed on both sides.

The embossing or profiling may be of any suitable pattern. For example, the sealant material may have a castellated profile or a beaded profile. The embossing or profiling is conveniently carried out during the manufacture of the sealing material and, in particular, when the sealing material is being cured. For example, where the sealant material is made by mixing a two-part polysulphide sealant, applying the mixed sealant to a glass fibre fabric and then pressing in a press until the sealant has cured, the press may have profiled or embossed platens to produce a correspondingly profiled or embossed sheet of sealing material. Alternatively, where the mixed sealant and glass fibre is pressed between rollers and then passed into an oven to cure, the rollers may be profiled or embossed.

In a further aspect, the invention provides a sealing material having regions of differing thickness, the regions of differing thickness being arranged such that the effective sealing range of the sealing material is greater than the effective sealing range of a sealing material having the same mean thickness and the same composition and having a uniform thickness. The use of such a sealing material having regions of differing thickness makes possible the sealing of larger sealing gaps than could have been sealed using the same amount of a similar sealing material having a uniform thickness.

The regions of differing thickness may vary across the sealing material in a predetermined manner. Preferably the regions of differing thickness are arranged in a regular pattern across the sealing material. Advantageously, the sealing material has a constant cross-section in one direction. Advantageously, the sealing material has at least one profiled or embossed surface. The sealing material may have one profiled or embossed surface. The sealing material may have two profiled or embossed surfaces. Preferably, the sealing material is in the form of a sheet or a film. The sheet or film may be profiled or embossed on one or both sides. In one embodiment, the sealing material is suitable for use in a joint on an aircraft. For use in aircraft, sealing materials comprising an at least partially-cured polysulphide sealant and a reinforcing element are particularly preferred. Other sealing materials for use in the method of the invention include resilient sealing materials such as expanded PTFE, and rubbers such as silicone rubbers and nitrile rubbers.

DESCRIPTION OF THE FIGURES

FIG. 2a shows a cross-sectional view of a flat film of sealing material;

FIG. 2b shows a cross-sectional view of the flat film of sealing material shown in FIG. 2a compressed to its maximum sealing thickness;

FIG. 2c shows a cross-sectional view of the flat film of sealing material shown in FIG. 2a compressed to its fully compressed thickness;

FIG. 3a shows a cross-sectional view of a flat film of sealing material having a profiled surface;

FIG. 3b shows a cross-sectional view of the film of sealing material shown in FIG. 3a compressed to its maximum sealed thickness; and FIG. 3c shows a cross-sectional view of the film of sealing material shown in FIG. 3a compressed to its fully compressed thickness.

DETAILED DESCRIPTION OF PREFERRED EMBODIMENT

Figure 1:
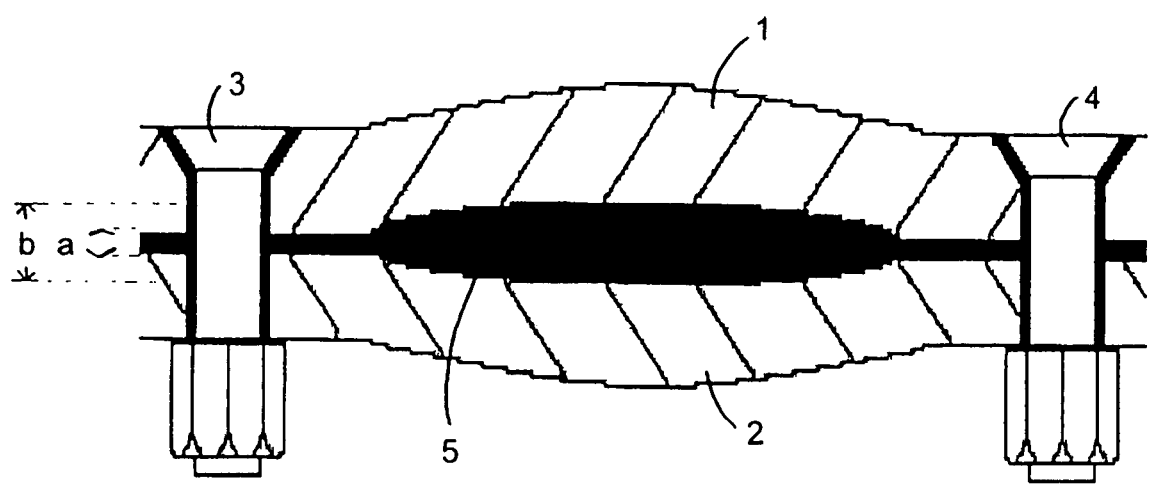
FIG. 1 shows a cross-section through a joint sealed with a solid sealing material.

FIG. 1 shows a cross-section through a joint comprising two metal sheets 1, 2 held together by two bolts 3, 4. Between the metal sheets 1, 2 is a layer of sealing material 5. Around each bolt 3, 4 the sealing material has been fully compressed and the distance 'a' between the faces of the metal sheets in those regions is the joint stand-off.

Between the two bolts 3, 4 is a region where the metal sheets 1, 2 are further apart. The greatest distance 'b' between the opposing faces of the sheets is the maximum joint face separation. The distance b–a is the sealing gap. As shown in FIG. 1, the void between the metal sheets 1, 2 in the region between the bolts 3, 4 is filled with the sealant 5. In order to seal against the metal sheets 1, 2 in the region where those sheets are separated by the maximum joint face separation, b, the sealing material must have a maximum sealing thickness greater than that maximum joint face separation.

FIG. 2a shows a piece of uncompressed sealing material of thickness $T_0=0.6$ mm. In FIG. 2b, the sealing material has been compressed to its maximum sealing thickness $T_{ms}$ of 0.48 mm. The fractional maximum sealing thickness is 80%. In FIG. 2c, the sealing material has been compressed to its fully compressed thickness $T_{jso}$ of 0.24 mm. The fractional fully compressed thickness is 40%. The effective sealing range is 0.48−0.24=0.24 mm.

FIG. 3a shows a piece of uncompressed sealing material having, on one side, a castellated profile. The thickness $T_0$ is 0.8 mm. FIG. 3b shows the material compressed to the maximum sealing thickness, $T_{ms}$, of 0.64 mm. Once again, the fractional maximum sealing thickness is 80%. FIG. 3c shows the fully compressed sealing material having a fully compressed thickness, $T_{jso}$, of 0.24 mm, corresponding to a fractional fully compressed thickness of 30%. The effective sealing range is 0.64−0.24=0.4 mm.

The pieces of sealing material shown in FIGS. 2a-c and 3a-c each have the same volume of sealing material having the same fractional maximum sealing thickness of 80% and the same fully compressed thickness of 0.24 mm. The use of a profiled surface results in an increase in the effective sealing range from 0.24 mm to 0.4 mm.

Example 1

A joint was specified to have a maximum joint face separation in the quilted areas between the bolts of 0.25 mm. Thus, the sealing gap for the joint was 0.25 mm. A suitable sealant material was found in tests to have a fractional maximum sealing thickness of 80% and a fractional fully compressed thickness of 40%.

In order to seal effectively over the whole joint, a thickness of sealing material must be used such that the effective sealing range is at least equal to the sealing gap of 0.25 mm. Thus 0.25 mm must be equal to (80%−40%)=40% of the minimum thickness, that is, the uncompressed thickness of the sealing material must be at least 0.625 mm. Using a sealing material of thickness 0.625 mm (100%) would give a maximum joint face separation of 0.5 mm (80%) and a joint stand-off of 0.25 mm (40%).

Example 2

In the joint described in Example 1, a 1.1 mm thickness of the same sealing material is used. The effective sealing range is 1.1 mm×(0.8−0.4)=0.44 mm. That effective sealing range is 0.19 mm greater than the required sealing range of 0.25 mm but that margin may be desired to allow for surface defects and movement. The joint stand-off is 1.1 mm×0.40=0.44 mm.

Example 3

Preparation of a Reinforced Polysulphide Sealing Material

A conventional manganese dioxide polysulphide sealant, Chemetall MC238-A1/2 having a faster cure time than is normally used in airframe assembly (½ hour work-life grade), was mixed and evenly applied to a 200 mm×200 mm release sheet of PTFE. A 150 mm×150 mm square of 120 gram per square meter woven glass-fibre cloth of maximum thickness 0.25 mm was placed over the smoothed out sealant layer. Sealant was worked through the woven glass cloth using a plastic spatula (to remove entrapped air) and a second layer of sealant was smoothed over the glass with the spatula. A second PTFE release sheet was placed over the sealant and glass layers and the assembly was transferred to a hand press where the press was 'bumped' (opened and closed) to remove any further entrapped air and to flow the sealant to an even film thickness.

The press was clamped fully shut and left to cure. After 16 hours curing time, the press was opened and the PTFE release sheets were removed. A very high quality, void-free, polysulphide, glass-reinforced film with a thickness of 0.35 mm was produced. The film was high in tensile strength in both longitudinal and transverse directions compared to a non-reinforced polysulphide film, yet it was flexible.

This film was then cut into 25 mm×25 mm squares and these were placed between anodised aluminium alloy painted with primer, in a standard lap shear configuration and compressed to a load of 1000 kg. After compressing for two weeks the lap shear specimens were removed and subjected to loading to failure in a tensometer. A high level of bonding was observed.

Whilst the present invention has been described and illustrated with reference to a particular embodiment it will be appreciated by those of ordinary skill in the art that the invention lends itself to many different variations not illustrated herein. For that reason, reference should be made to the claims for determining the true scope of the present invention.

The invention claimed is:

1. A method of sealing a joint between components in an aircraft comprising the steps of:
   i) identifying the sealing gap to be sealed, wherein the sealing gap is the difference between the distance between the mating surfaces of the components in the region where a sealing material is most compressed and the maximum distance between the mating surfaces of the components;
   ii) selecting a suitable sheet or film sealing material which includes a polysulphide sealant and a reinforcing element and has a fractional maximum sealing thickness and a fractional fully-compressed thickness and selecting a suitable thickness of that sealing material, based on a consideration of the fractional maximum sealing thickness and the fractional fully-compressed thickness of the sealing material and on the sealing gap;

iii) locating, between the mating surfaces of the components to be sealed, the suitable thickness of the suitable sealing material; and iv) fastening the components together.

2. A method as claimed in claim 1 in which the suitable sealing material and the thickness of that suitable sealing material are selected in order to provide sealing across the sealing gap and a desired joint stand-off.

3. A method as claimed in claim 1 in which both a suitable sealing material is first identified and a minimum suitable thickness of that sealing material is calculated based on the fractional maximum sealing thickness and the fractional fully compressed thickness of the sealing material and on the sealing gap, and a suitable thickness of sealing material being equal to or greater than that minimum thickness is selected.

4. A method as claimed in claim 1 which also includes the step of testing a sealing material to obtain the fractional fully-compressed thickness and/or the fractional maximum sealing thickness of that sealing material.

5. A method as claimed in claim 1 in which the sealing material is profiled or embossed.

6. A method of establishing the minimum thickness of sealing material for a joint in an aircraft comprising the steps of:
   i) ascertaining the sealing gap to be sealed, wherein the sealing gap is the difference between the distance between the mating surfaces of the components in the region where a sealing material is most compressed and the maximum distance between the mating surfaces of the components;
   ii) selecting a suitable sheet or film sealing material which includes a polysulphide sealant and a reinforcing element and has a fractional maximum sealing thickness and a fractional fully-compressed thickness;
   iii) calculating, from the fractional maximum sealing thickness and from the fractional fully-compressed thickness, the minimum thickness of sealing material required to seal over the sealing gap.

7. A method of sealing a joint between components during assembly of an aircraft comprising the steps of:
   i) identifying the sealing gap to be sealed, wherein the sealing gap is the difference between the distance between the mating surfaces of the components in the region where a sealing material is most compressed and the maximum distance between the mating surfaces of the components;
   ii) selecting a suitable sealing material, the sealing material comprising cured polysulphide sealant having a fractional maximum sealing thickness and a fractional fully-compressed thickness and selecting a suitable thickness of that sealing material, based on a consideration of the fractional maximum sealing thickness and the fractional fully-compressed thickness of the sealing material and on the sealing gap;
   iii) locating, between the mating surfaces of the components to be sealed, the suitable thickness of the suitable sealing material; and
   iv) fastening the components together.

8. A method of sealing a joint between components in an aircraft comprising the steps of:
   i) identifying the sealing gap to be sealed, wherein the sealing gap is the difference between the distance between the mating surfaces of the components in the region where a sealing material is most compressed and the maximum distance between the mating surfaces of the components;
   ii) selecting a suitable sheet or film sealing material which includes a polysulphide sealant and a reinforcing element and has a fractional maximum sealing thickness and a fractional fully-compressed thickness and selecting a suitable thickness of that sealing material, based on a consideration of the fractional maximum sealing thickness and the fractional fully-compressed thickness of the sealing material and on the sealing gap;
   iii) locating, between the mating surfaces of the components to be sealed, the suitable thickness of the suitable sealing material;
   iv) fastening the components together; and
   v) allowing the sheet or film sealing material to bond to the mating surfaces of the components to be sealed, such that at least some of any load applied to one of the components can be transferred to the other component through the sealing material.

9. A method of sealing a joint between components in an aircraft comprising the steps of:
   i) identifying the sealing gap to be sealed, wherein the sealing gap is the difference between the distance between the mating surfaces of the components in the region where a sealing material is most compressed and the maximum distance between the mating surfaces of the components;
   ii) selecting a suitable sheet or film sealing material which includes a polysulphide sealant and a reinforcing element and has a fractional maximum sealing thickness and a fractional fully-compressed thickness and selecting a suitable thickness of that sealing material, based on a consideration of the fractional maximum sealing thickness and the fractional fully-compressed thickness of the sealing material and on the sealing gap;
   iii) locating, between the mating surfaces of the components to be sealed, the suitable thickness of the suitable sealing material; and
   iv) fastening the components together, in which the joint is a fuselage joint, stringer joint, a glazing unit joint, a joint in a pump or a joint between wing spars, ribs and stringers and the skin which is part of an integral fuel tank.

* * * * *